United States Patent
Lee et al.

(10) Patent No.: US 9,414,579 B2
(45) Date of Patent: Aug. 16, 2016

(54) SYSTEMS AND METHODS FOR CONTROLLING PEST INFESTATION OF A WOODY PLANT

(71) Applicant: Dow AgroSciences LLC, Indianapolis, IN (US)

(72) Inventors: Leng C Lee, SA (MY); Ricky Cahyanegara, Jakarta (ID)

(73) Assignee: Dow AgroSciences LLC, Indianapolis, IN (US)

( * ) Notice: Subject to any disclaimer, the term of this patent is extended or adjusted under 35 U.S.C. 154(b) by 0 days.

(21) Appl. No.: 14/194,182

(22) Filed: Feb. 28, 2014

(65) Prior Publication Data

US 2014/0250768 A1   Sep. 11, 2014

Related U.S. Application Data

(60) Provisional application No. 61/775,858, filed on Mar. 11, 2013.

(51) Int. Cl.
*A01N 25/00* (2006.01)
*A01N 47/30* (2006.01)
*A01M 1/20* (2006.01)

(52) U.S. Cl.
CPC .................................. *A01M 1/2011* (2013.01)

(58) Field of Classification Search
None
See application file for complete search history.

(56) References Cited

U.S. PATENT DOCUMENTS

| 3,909,975 | A * | 10/1975 | Basile | A01M 1/245 |
| | | | | 137/351 |
| 4,576,801 | A | 3/1986 | Parry et al. | |
| 6,416,752 | B1 | 7/2002 | Richardson et al. | |
| 6,691,453 | B1 * | 2/2004 | Rojas | A01N 25/006 |
| | | | | 424/84 |
| 7,233,251 | B2 * | 6/2007 | Lewis | A01M 1/026 |
| | | | | 340/556 |
| 2008/0187565 | A1 | 8/2008 | Hill et al. | |
| 2012/0055076 | A1 * | 3/2012 | Smith | A01M 1/2011 |
| | | | | 43/131 |

FOREIGN PATENT DOCUMENTS

| WO | 2006/055473 A2 | 5/2006 |
| WO | 2008/079384 A1 | 7/2008 |

OTHER PUBLICATIONS

International Search Report dated Jun. 20, 2014 as received in Application No. PCT/US2014/019550.
Written Opinion of the International Searching Authority dated Jun. 20, 2014 as received in Application No. PCT/US2014/019550.

* cited by examiner

*Primary Examiner* — Alton Pryor
(74) *Attorney, Agent, or Firm* — Carl D. Corvin; Maschoff Brennan

(57) ABSTRACT

Systems and methods for controlling and/or preventing infestation of a woody plant by one or more species of pests are provided. In one particular but non-limiting form, a composite member is positioned at a locus near a woody plant that is susceptible to damage by one or more wood-destroying pest species such as termites. The composite member includes a pesticide and a bait material palatable to the one or more wood-destroying pest species. In one aspect, the composite member includes an extruded mixture of the pesticide and bait material. Further embodiments, forms, features, and aspects shall become apparent from the description and drawings.

8 Claims, 6 Drawing Sheets

SYSTEMS AND METHODS FOR CONTROLLING PEST INFESTATION OF A WOODY PLANT

CROSS REFERENCE TO RELATED APPLICATIONS

This application claims the benefit of U.S. Provisional Patent Application Ser. No. 61/775,858 filed Mar. 11, 2013, the entire disclosure of which is hereby expressly incorporated by reference.

BACKGROUND

The protection of wooden structures from damage caused by pests has been an area of particular interest for many years, and the removal of pests from areas occupied by humans, livestock, and crops has long been a challenge. Pests of frequent concern include various types of insects and rodents. Termites, including subterranean termites, are a particularly troublesome type of pest with the potential to cause severe damage to wooden structures and woody plants such as trees or shrubs among other possibilities. Various schemes have been proposed to eliminate termites and certain other harmful pests of both the insect and non-insect variety. In one approach, pest control relies on the blanket application of liquid pesticides in the area to be protected. In some instances, the liquid pesticides can be carried away from their site of application by rain or other surface water, giving rise to potential environmental concerns and abbreviated periods of pest control. In addition, the blanket application of liquid pesticides may also lack the requisite focus or targeting necessary to achieve effective pest control.

In view of the foregoing, there is a demand for further improvements in this area of technology.

SUMMARY

The present application is generally directed to systems and methods for controlling and/or preventing infestation of a woody plant by one or more species of pests. In one particular but non-limiting form, a composite member is positioned at a locus near a woody plant that is susceptible to damage by one or more wood-destroying pest species such as termites. The composite member includes a pesticide and a bait material palatable to the one or more wood-destroying pest species. In one aspect, the composite member includes an extruded mixture of the pesticide and bait material.

In one embodiment, a method includes identifying a locus near a growing site of a woody plant susceptible to damage from one or more species of termites and positioning a composite member at the locus. The composite member includes a pesticide and a bait material palatable to the one or more species of termites.

In another embodiment, a system includes a composite member positioned at a location adjacent to a growing site of a woody plant susceptible to damage from one or more species of termites. The composite member includes a pesticide and a bait material palatable to the one or more species of termites.

In still another embodiment, a method includes identifying a woody plant actively infested by one or more species of insects; forming an interrupted area in a pathway providing insect access to the woody plant; and positioning a pesticidal bait member in the interrupted area.

In yet another embodiment, a method includes forming a hole at a first location configured to receive a woody plant being transplanted from a second location; placing a pesticidal bait member in the hole; and positioning the woody plant in the hole.

Another embodiment of the present application is a unique technique for controlling and/or preventing pests. Other embodiments include unique methods, systems, devices, kits, assemblies, equipment, and/or apparatus involving pest control and/or pest prevention techniques.

Further embodiments, forms, features, aspects, benefits, objects and advantages of the present application shall become apparent from the detailed description and figures provided herewith.

DETAILED DESCRIPTION OF SELECTED EMBODIMENTS

Figure 1:
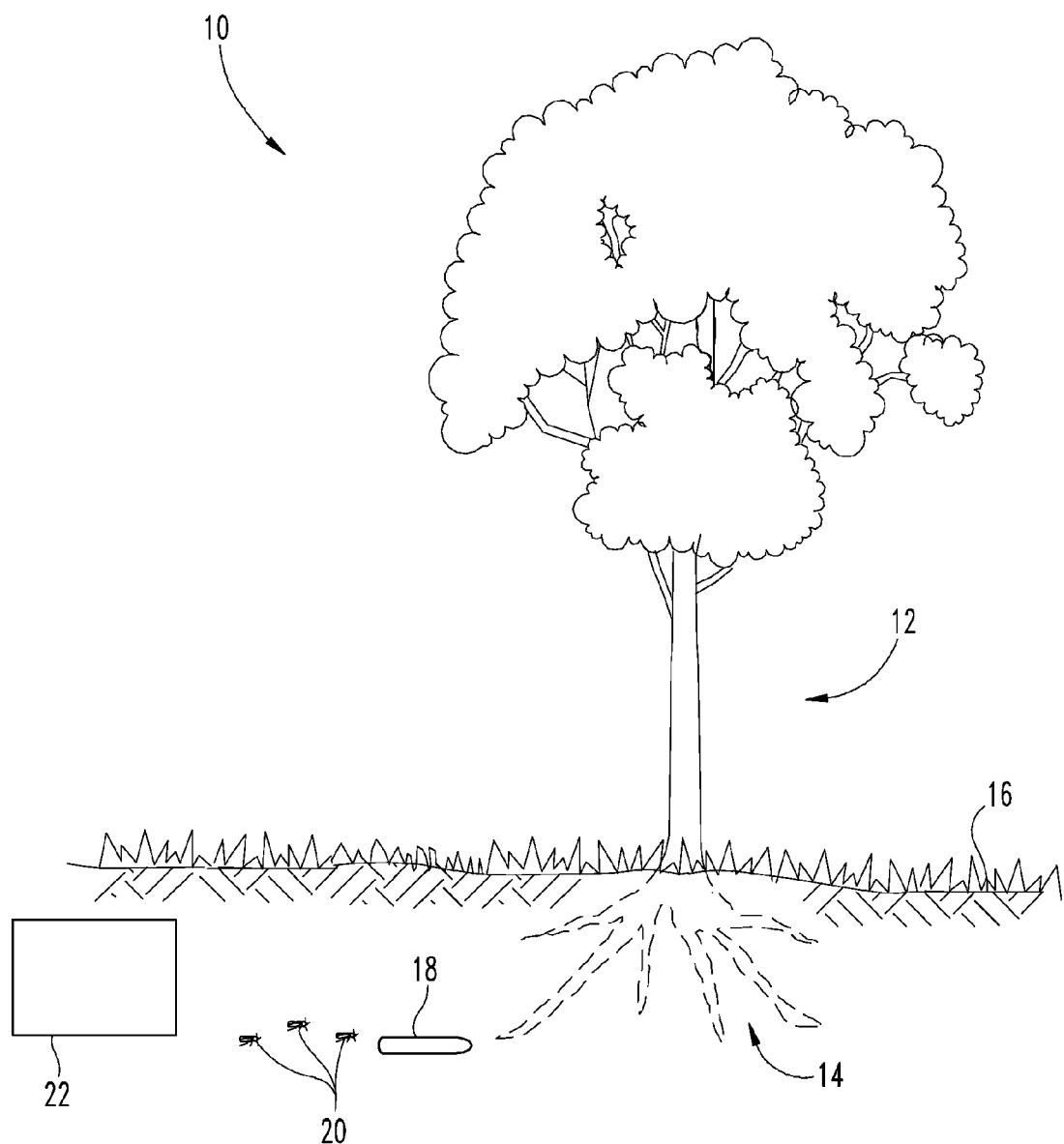
FIG. 1 is a schematic illustration of one system for controlling and/or preventing pest infestation of a woody plant.

For the purposes of promoting an understanding of the principles of the inventions described herein, reference will now be made to the embodiments illustrated in the drawings and specific language will be used to describe the same. It will nevertheless be understood that no limitation of the scope of any invention is thereby intended. Any alterations and further modifications in the illustrated embodiments, and any further applications of the principles described and illustrated herein are contemplated as would normally occur to one skilled in the art.

Systems and methods for controlling and/or preventing infestation of a woody plant such as a tree or shrub by one or more species of pests, including insects, are provided. In one particular but non-limiting form, a composite member is positioned at a locus near a woody plant that is susceptible to damage by one or more wood-destroying pest species. The term "wood-destroying pest" is used herein to refer to an insect or other pest that destroys the structural integrity of wood by boring into or consuming wood. Examples include, without limitation, termites, carpenter ants, carpenter wasps and other wood boring or cellulose consuming organisms. The composite member includes a pesticide that is toxic to the one or more wood-destroying pest species and a bait material palatable to the one or more wood-destroying pest species. Use of the systems and methods disclosed herein to control non-wood destroying pests is also contemplated.

In one aspect, the composite member is provided in a form that is moisture and degradation resistant and exhibits long-term durability and integrity. Similarly, in this form, it is contemplated that the composite member will generally be resistant to breaking apart following its placement in soil or other media. While not being limited to any particular configuration, in one aspect of this form the composite member is formed by an extruded mixture of the bait material and pesticide. In a more particular aspect of this form, the extruded mixture also includes a thermoplastic polymer material which, while not being limited to any particular configuration, can increase the moisture and degradation resistance of the pesticidal bait. Further details regarding non-limiting examples of extruded pesticidal baits are found in International Patent Publication No. WO 2008/079384, the contents of which are incorporated herein by reference in their entirety.

In further aspects, it is also contemplated that one or more composite members that have a bait material and a pesticide and are configured to break apart or disintegrate over time and/or upon exposure to moisture may be used alone or in combination with the moisture and degradation resistant composite members described above. In one form, this type of composite member is formed by a compressed mixture of the bait material and pesticide. In one aspect, the compressed form of the composite member is configured to provide sufficient strength and structural integrity for a desired end use of the pesticidal bait. The pesticide retains its bioactivity as it resides within the compressed form, and produces a desired result after the pesticidal bait is ingested by or otherwise comes into contact with pests. The bait material may be defined by a material or mixture of materials that readily biodegrade and/or dissolve into the soil or other medium where each respective composite member is positioned. Following disintegration of the compressed bait and/or biodegradation/dissolution of the bait material, the pesticide retains its bioactivity and creates an effective barrier in the soil or other medium surrounding the original composite member in order to provide long-term control of the one or more species of pest even after the original composite member is no longer present.

As indicated above, various systems and methods disclosed herein involve the use of one or more of the above-described composite members in order to control infestation of a woody plant by one or more species of pests such as insects. More particularly, with reference to FIG. 1 for example, a system 10 for controlling infestation of tree 12 has been established. In the illustrated form, tree 12 is isolated from other trees; however it should be understood that forms are possible in which tree 12 is a member of a grove, orchard or forest of other trees or woody plants and system 10 is further established for controlling insect infestation of one or more of these other trees or woody plants. Tree 12 includes a root system 14 which extends below ground level 16. A composite member 18 that includes a bait material and a pesticide is positioned near root system 14 below ground level 16.

In this arrangement, pests such as foraging termites 20 from subterranean colony 22 may encounter composite member 18 when moving in the proximity of tree 12. Upon encountering composite member 18, attraction of the foraging termites 20 to the bait material of composite member 18 is expected, and subsequent consumption or displacement of composite member 18 is also expected. As composite member 18 is consumed or displaced by foraging termites 20, the pesticide in composite member 18 is also consumed or displaced which produces a desired pesticidal effect of the foraging termites 20 and other termites of colony 22. For example, the pesticidal effect on the other termites of colony 22 may be achieved through the spread of the pesticide by the foraging termites 20 to the other termites through contact or trophallaxis, amongst other possibilities. In forms where composite member 18 degrades following its positioning near root system 14 and before being encountered by the foraging termites 20, the desired pesticidal effect may be achieved when the foraging termites 20 come into contact with residual pesticide in the fill, soil or ground surrounding the original location of composite member 18.

As indicated above, composite member 18 is positioned below ground level 16 in the illustrated form of FIG. 1. It should be understood however that other variations for the positioning of composite member 18 relative to tree 12 and ground level 16 are possible. For example, in addition to or in lieu of the illustrated position of composite member 18, forms in which composite member 18 is deeper, shallower or at or above ground level 16 are contemplated. In one such form, composite member 18 may be positioned near tree 12 and at or above ground level 16 in order to target pests that may originate from a colony that is not below ground level 16 like subterranean colony 22. Forms in which system 10 also includes a plurality of composite members 18 positioned at different locations around and/or at different levels relative to tree 12 are also possible. For example, in one form composite members 18 may be arranged to provide an exterior perimeter that extends around root system 14. In one aspect of this and other forms, composite members 18 of system 10 may be separated from one another by soil or other fill.

While not previously discussed, it should be understood that system 10 may be established near tree 12 or other woody plants to control pest infestation of tree 12 regardless of whether pests are actively present around or infesting tree 12. For example, composite member 18 could be positioned relative to tree 12 in order to proactively prevent and control infestation of tree 12. As an alternative, composite member 18 could be positioned relative to tree 12 in response to detecting or determining the presence of pests around or infesting tree 12. In these instances where the presence of pests is first detected or determined, it should be understood that composite member 18 could be responsively positioned relative to tree 12 in the manner illustrated in FIG. 1, although other variations are possible.

Figure 2:
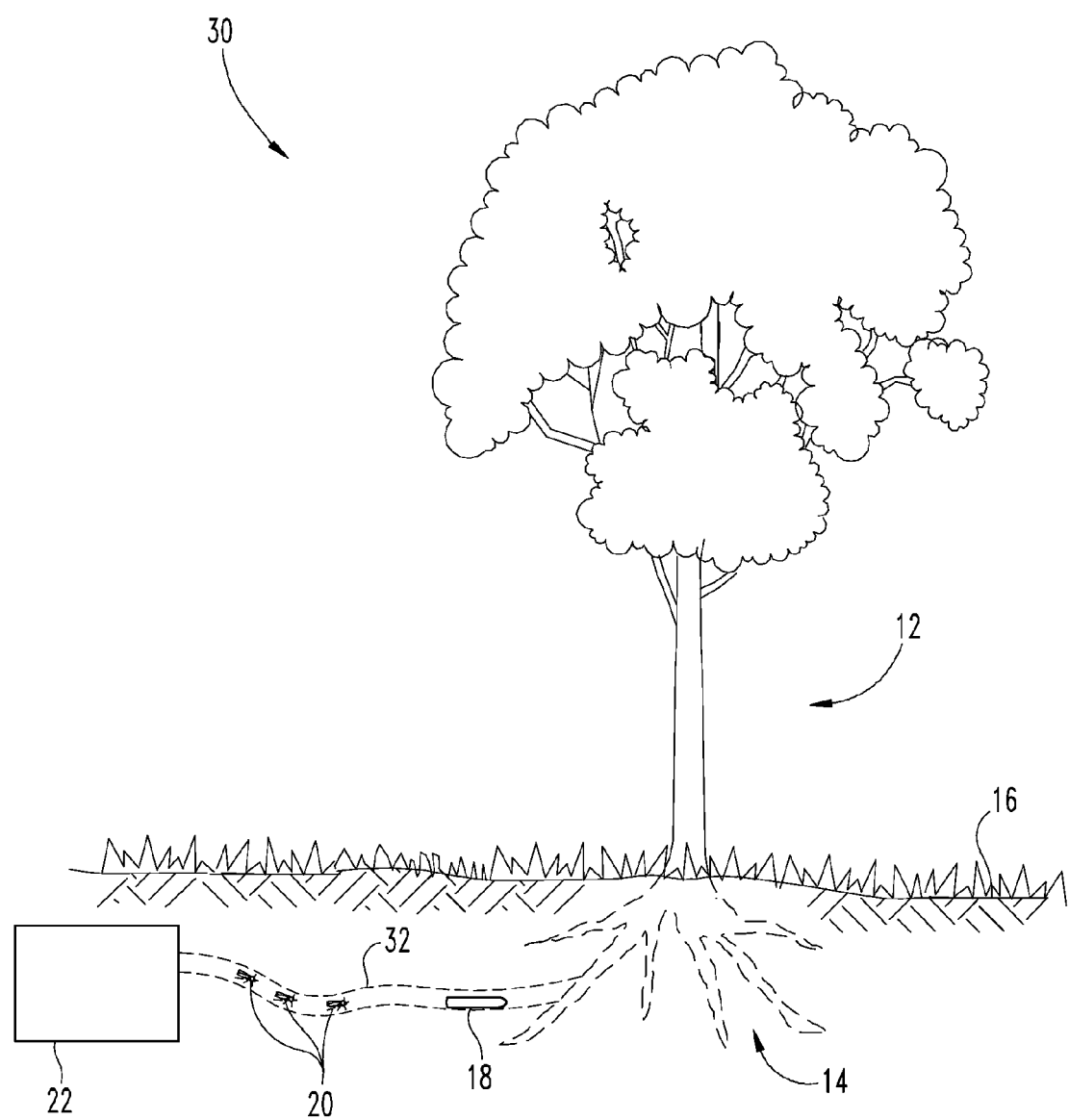
FIG. 2 is a schematic illustration of another system for controlling and/or preventing pest infestation of a woody plant.

System 30 of FIG. 2, where like numerals refer to like features previously described, illustrates one variation for positioning composite member 18 relative to tree 12 in response to detecting or determining the presence of pests such as foraging termites around or infesting tree 12. In system 30, a pathway 32 such as a mud trail or mud tunnel that facilitates access of foraging termites 20 between colony 22 and root system 14 and/or other portions of tree 12 is located and interrupted. For example, in the illustrated form, soil is removed from over pathway 32 and then at least a portion of pathway 32 is interrupted or disturbed to facilitate positioning of composite member 18 such that it at least partially obstructs pathway 32. In this arrangement, foraging termites 20 are guided into contact with composite member 18 as they move to and from root system 14 and/or other portions of tree 12. Once composite member 18 has been suitably positioned, soil or other fill may be replaced over it and the interrupted portion of pathway 32. In the illustrated form, pathway 32 and the portion thereof interrupted for placement of composite member 18 lie below ground level 16. However, it should be understood that forms are also possible in which a pathway 32 positioned at or above ground level 16 is interrupted or disturbed to facilitate placement of a composite member 18 in a manner that is the same or similar to that illustrated in FIG. 2. It is also contemplated that a plurality of composite members 18 could be positioned at a single interrupted location of pathway 32 or at separate, discrete interrupted locations of pathway 32. Further, in the event multiple pathways 32 exist between tree 12 and colony 22 or other colonies, it should be appreciated that each of the multiple pathways 32 can be interrupted and one or more composite members 18 placed in the interrupted areas. System 30 may also include one or more composite members 18 positioned near tree 12 in addition to those positioned relative to pathway 32.

Figure 3:
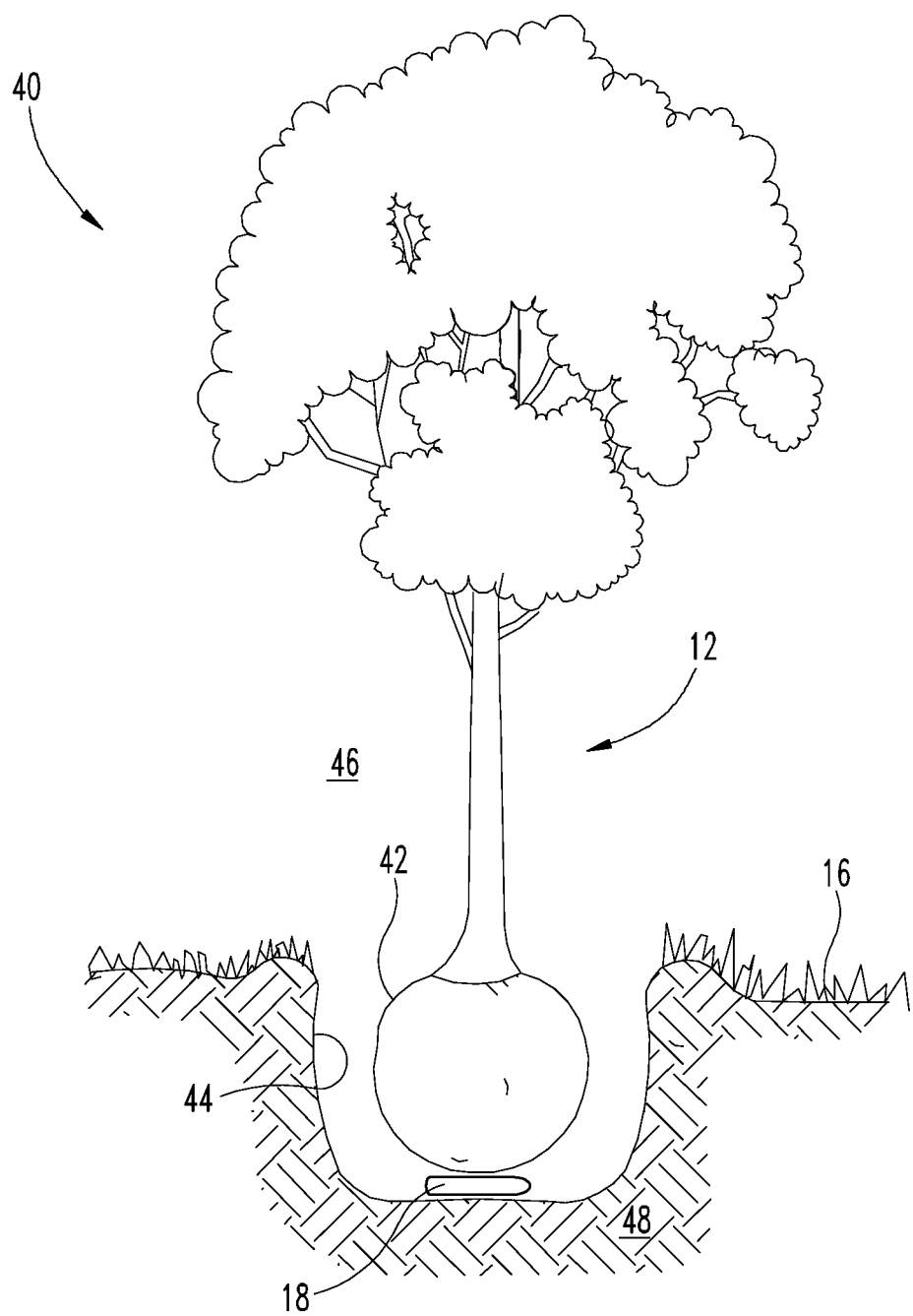
FIG. 3 is a schematic illustration of yet another system for controlling and/or preventing pest infestation of a woody plant.

FIG. 3 illustrates another system 40 for controlling infestation of tree 12 by one or more species of pests. In system 40, tree 12 is transplanted from another location (not shown) to location 46 where a hole 44 is formed to receive root ball 42 of tree 12. Root ball 42 may include the root system of tree 12 contained in a bag, sack or other type of cover. Forms in which root ball 42 is omitted from tree 12 being transplanted are also possible. In these forms, the root system of tree 12 may freely hang therefrom and be arranged to fit in hole 44. A composite member 18 is positioned between soil 48 surrounding hole 44 and root ball 42. In one form, composite member 18 is positioned in hole 44 before tree 12. In other forms, composite member 18 may be positioned in hole 44 simultaneously with or after tree 12. In the illustrated form, composite member 18 is generally positioned in the bottom of hole 44. Forms in which composite member 18 is positioned on the sides of hole 44 are also possible, as well as those in which a plurality of composite members 18 are placed in hole 44 along the sides and/or bottom. Once composite member(s) 18 and tree 12 have been suitably positioned, soil or other fill may be used to backfill hole 44.

Other variations to system 40 are contemplated. For example, in one non-illustrated form, rather than forming hole 44 configured to receive root ball 42, root ball 42 can be positioned directly on the surface of ground level 16 and soil or other fill may be brought in around root ball 42 and/or other portions of tree 12. In this form, one or more composite members 18 may be placed on the surface of ground level 16 below tree 12 and/or in the soil or fill being positioned around root ball 42 and/or other portions of tree 12. System 40 may also include one or more composite members 18 positioned relative to tree 12 similar to the arrangement illustrated and described in connection with FIGS. 1 and 2. Further, while not previously mentioned, it should be understood that system 40 may be implemented in connection with trees and/or other woody plants being transplanted regardless of whether any indications of pest presence or infestation exit at the locations where transplanting activities occur.

Figure 4:
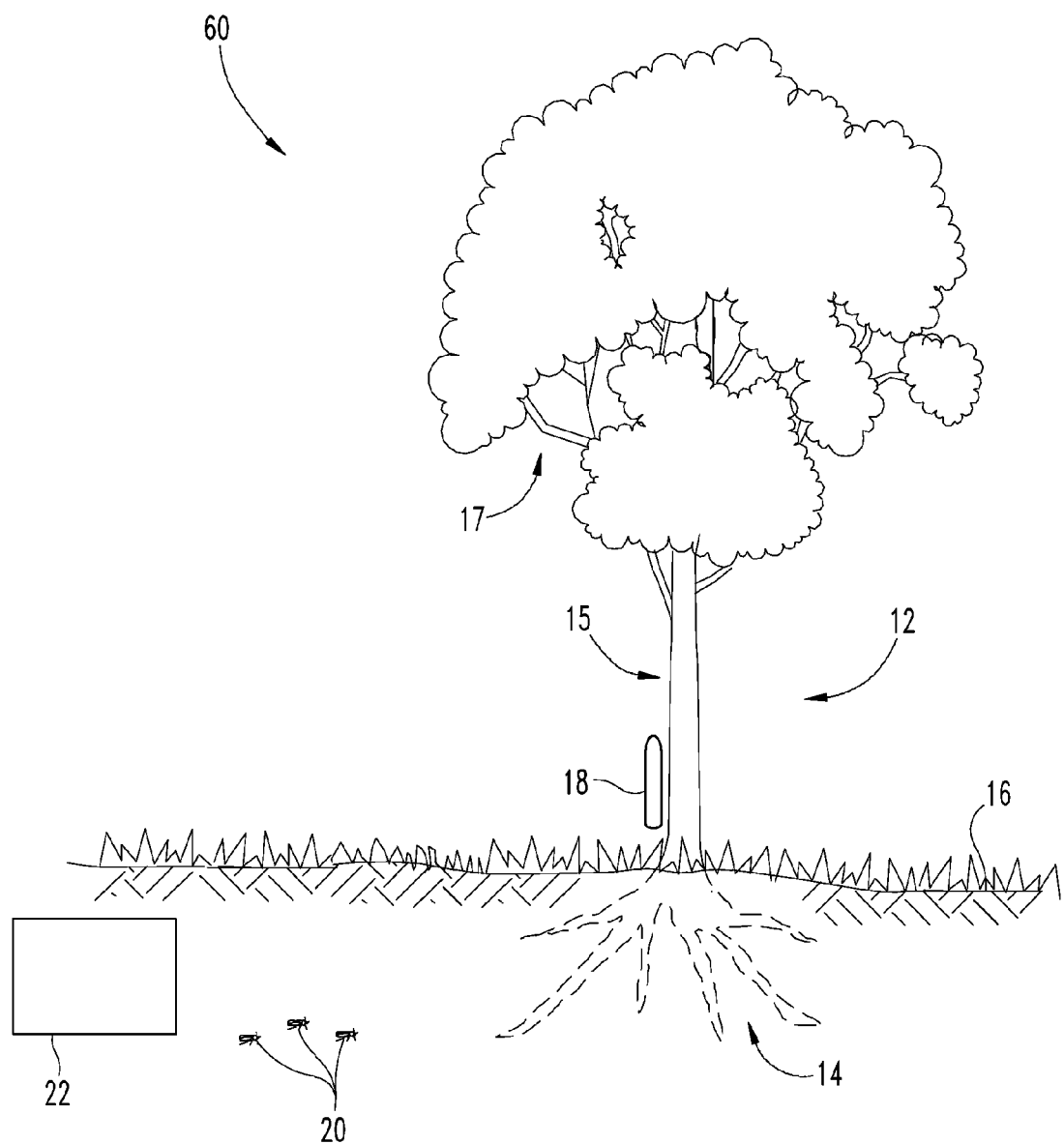
FIG. 4 is a schematic illustration of another system for controlling and/or preventing pest infestation of a woody plant.

FIG. 4 illustrates another system 60 for controlling infestation of tree 12 by one or more species of pests. In FIG. 4, like numerals refer to like features previously described. In system 60, a composite member 18 that includes a bait material and a pesticide is positioned on or near an outer layer, such as bark, of trunk system 15 of tree 12. In the illustrated form, composite member 18 is positioned above ground level 16, although it should be understood that alternative positioning of composite member 18 is possible as will be discussed in greater detail below.

In the arrangement of system 60, pests such as foraging termites 20 from subterranean colony 22 may encounter composite member 18 when moving over the outer layer of the trunk system 15 or through the trunk system 15 to the outer layer. Upon encountering composite member 18, attraction of the foraging termites 20 to the bait material of composite member 18 is expected, and subsequent consumption or displacement of composite member 18 is also expected. As a result, a pesticidal effect on the foraging termites and other termites of colony 22 may be achieved as discussed above in connection with system 10 illustrated in FIG. 1. In forms where composite member 18 degrades following its positioning near trunk system 15 and before being encountered by the foraging termites 20 or other pests, the desired pesticidal effect may be achieved when the foraging termites 20 or other pests come into contact with residual pesticide on or in the outer layer of truck system 15 or in the soil or ground surrounding the original location of composite member 18.

As indicated above, in the illustrated form composite member 18 is positioned on or near the outer layer of trunk system 15 and above ground level 16. It should be understood however that other variations for the positioning of composite member 18 relative to the branches 17 and the ground level 16 are possible. For example, in addition to or in lieu of the illustrated position of composite member 18, forms in which composite member 18 is positioned at ground level 16 and/or above its illustrated position relative to ground level 16 are possible. Forms in which system 60 also includes a plurality of composite members 18 positioned at different locations around and/or at different levels relative to trunk system 15, branches 17 and ground level 16 are also possible. For example, in one form composite members 18 may be arranged to provide an exterior perimeter that extends around the trunk system 15. Forms of system 60 in which one or more composite members 18 are positioned on or near one or more of the branches 17 are also contemplated.

It should be appreciated that composite member(s) 18 employed in systems 10, 30, 40 and 60 may be freestanding; i.e., each does not include nor is it positioned in any housing, station, enclosure, or other type of structure. Similarly, the soil, fill, earth, tree material or other medium in or on which each composite member 18 is positioned is in direct contact with their external surface. However, forms in which one or more of composite members 18 are positioned in a housing or station are also possible. Further, in one or more forms, a cover may be positioned over all or part of one or more of composite members 18. For example, a tape material or plastic bag may cover all or part of a composite member 18, provided however that any such covering will still facilitate access to composite member 18 through openings in the covering or by degradation, destruction or the like of the covering by targeted pests or environmental factors.

In addition, the number of composite members 18 and the arrangements thereof illustrated in FIGS. 1-4 are exemplary only, and other variations are contemplated and expected. More particularly, as would be appreciated by those skilled in the art, the number of composite members 18 used at a certain location may be dependent on, amongst other things, the number, size and type of trees or other woody plants at the location, the size and shape of composite member 18, the concentration of pesticide in composite member 18, and the type of soil or surface in or on which composite member 18 is being positioned. It should be further understood that systems 10, 30, 40, 60 may implemented in connection with a single tree or woody plant or a plurality of trees or woody plants. For example, in one form systems 10, 30, 40, 60 are established in a grove or orchard of trees or woody plants where one or more composite members 18 are positioned relative to one or more of the trees or woody plants. The trees or woody plants may be of any type which is susceptible to damage or infestation by one or more species of pests. In one particular form, the trees or woody plants are of a type that is susceptible to or currently affected by infestation or damage by one or more wood-destroying pest species such as termites. More specific but non-limiting examples of these types of trees or woody plants include oil palm trees and rubber trees, just to provide a few possibilities.

While also not previously discussed above, it should be appreciated that composite members 18 can be provided for and arranged in systems 10, 30, 40, 60 by a single entity or individual, although forms where more than one entity or individual cooperate to provide composite members 18 and arrange them in systems 10, 30, 40, 60 are also possible. For example, in one more specific form where a single entity provides and arranges composite member(s) 18, a pest service provider brings composite member(s) 18 to the site or location where systems 10, 30, 40, 60 will be installed and then proceeds with positioning composite member(s) 18 as discussed and described herein. As another example, in one more specific form where multiple entities or parties are involved with the provision and arrangement of composite member(s) 18 with respect to systems 10, 30, 40, 60 a manufacturer, wholesaler, distributor, seller or other provider of composite member(s) 18 directly or indirectly sends or supplies composite member(s) 18 to the site or location where systems 10, 30, 40, 60 will be installed and then another entity or party, such as a nursery, grower, planter, gardener or pest service provider, arranges composite member(s) 18 in systems 10, 30, 40, 60 as discussed and described herein. In one aspect of this form, the manufacturer, wholesaler, distributor, seller or other provider of composite member(s) 18 also provides instructions or directions for arranging composite member(s) in systems 10, 30, 40, 60 as discussed and described herein. Still, it should be appreciated that alternative arrangements for the provision and positioning of composite member(s) 18 are also contemplated and fall within the scope of the subject application.

Figure 5:
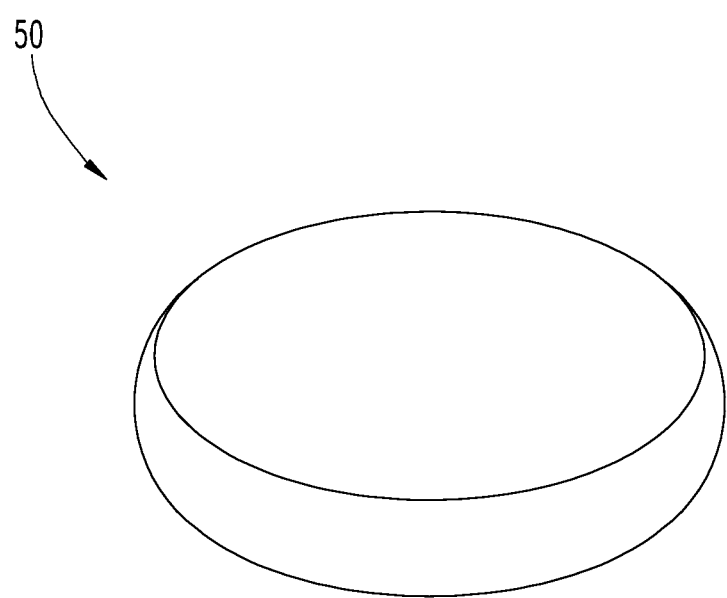
FIG. 5 is a perspective view of one form for a composite member including a pesticide and bait material.

Without being limited to any particular form, FIG. 5 provides one non-limiting example of a form in which composite member 18 described herein may be provided. More particularly, as illustrated in FIG. 5 composite member 18 is the form of a disk 50. Still, other variations for the shape and form of composite member 18 are possible, including those in which composite member 18 is puck-shaped, tablet-shaped or rod-shaped, just to provide a few non-limiting examples. In one aspect, composite member 18 may weigh at least about 30 grams. In another aspect, composite member 18 weighs 30 grams or more. In still another aspect, composite member 30 weighs more than 30 grams, 40 grams, 50 grams or even 60 grams. However, other variations for the weight of composite member 18 are contemplated and fall within the scope of the present application.

Regardless of shape, size, weight, or the like, in certain embodiments, composite member 18 is in the form of a solid member. In one example, composite member 18 includes a carrier in the solid phase at standard temperature and pressure that carries one or more pesticides that may be solid at standard temperature and pressure or otherwise (such as a liquid absorbed by or otherwise contained within the carrier). In one form, the carrier is a matrix palatable to the targeted pests and at least one pesticide is dispersed throughout. In another form, the composite members 18 described herein generally include a bait material that is palatable to one or more species of pests and a pesticide that is toxic to the one or more species of pests. In one embodiment, the bait material is a cellulosic food material that is selected based upon known or measured attractability for a given pest that is being targeted. In one aspect for example, when the composite member is to be used to target a certain pest species, the composite member can be made using a cellulosic food material that is a favorite food of the target pest species. The cellulosic food material would therefore be palatable to members of the target pest species, such as termites, and would be expected to be consumed or displaced by the pests, which would result in the simultaneous consumption or displacement of the pesticide present in the composite member, producing a desired pesticidal effect. In one embodiment, the food material is a purified cellulose, such as, for example, alpha cellulose, including compressed alpha cellulose. One non-limiting example of compressed alpha cellulose includes preferred texture cellulose (PTC). In another embodiment, the food material is wood or a derivative of wood. Non-limiting examples of wood and wood derivatives include wood chips, wood fibers, sawdust, cardboard, paper or other material that is palatable to a targeted wood-destroying species. Other cellulosic food materials that can be employed include microcrystalline cellulose, examples of which are provided in U.S. Pat. No. 6,416,752, the contents of which are incorporated herein by reference in their entirety, and modified polymeric cellulose based materials such as, for example, METHOCEL® or ETHOCEL®, which are available commercially from The Dow Chemical Company, Midland, Mich.

The pesticide included in composite member 18 is one that kills pests that ingest or come into contact or exposure with the pesticide. In one aspect, the pesticide retains its bioactivity as it resides within the composite member 18 and, where applicable, for a period of time following the biodegradation/dissolution of the composite member, and produces a desired result after it is ingested by or otherwise comes into contact with pests. Some of the pesticides that can be employed in the composite members disclosed herein include, but are not limited to the following:

1,2-dichloropropane, abamectin, acephate, acetamiprid, acethion, acetoprole, acrinathrin, acrylonitrile, alanycarb, aldicarb, aldoxycarb, aldrin, allethrin, allosamidin, allyxycarb, alpha-cypermethrin, alpha-ecdysone, alpha-endosulfan, amidithion, aminocarb, amiton, amiton oxalate, amitraz, anabasine, athidathion, azadirachtin, azamethiphos, azinphos-ethyl, azinphos-methyl, azothoate, barium hexafluorosilicate, barthrin, bendiocarb, benfuracarb, bensultap, beta-cyfluthrin, beta-cypermethrin, bifenthrin, bioallethrin, bioethanomethrin, biopermethrin, bistrifluron, borax, boric acid, bromfenvinfos, bromocyclen, bromo-DDT, bromophos, bromophos-ethyl, bufencarb, buprofezin, butacarb, butathiofos, butocarboxim, butonate, butoxycarboxim, cadusafos, calcium arsenate, calcium polysulfide, camphechlor, carbanolate, carbaryl, carbofuran, carbon disulfide, carbon tetrachloride, carbophenothion, carbosulfan, cartap, cartap hydrochloride, chlorantraniliprole, chlorbicyclen, chlordane, chlordecone, chlordimeform, chlordimeform hydrochloride, chlorethoxyfos, chlorfenapyr, chlorfenvinphos, chlorfluazuron, chlormephos, chloroform, chloropicrin, chlorphoxim, chlorprazophos, chlorpyrifos, chlorpyrifos-methyl, chlorthiophos, chromafenozide, cinerin I, cinerin II, cinerins, cismethrin, cloethocarb, closantel, clothianidin, copper acetoarsenite, copper arsenate, copper naphthenate, copper oleate, coumaphos, coumithoate, crotamiton, crotoxyphos, crufomate, cryolite, cyanofenphos, cyanophos, cyanthoate, cyantraniliprole, cyclethrin, cycloprothrin, cyfluthrin, cyhalothrin, cypermethrin, cyphenothrin, cyromazine, cythioate, DDT, decarbofuran, deltamethrin, demephion, demephion-O, demephion-S, demeton, demeton-methyl, demeton-O, demeton-O-methyl, demeton-S, demeton-S-methyl, demeton-S-methylsulphon, diafenthiuron, dialifos, diatomaceous earth, diazinon, dicapthon, dichlofenthion, dichlorvos, dicresyl, dicrotophos, dicyclanil, dieldrin, diflubenzuron, dilor, dimefluthrin, dimefox, dimetan, dimethoate, dimethrin, dimethylvinphos, dimetilan, dinex, dinex-diclexine, dinoprop, dinosam, dinotefuran, diofenolan, dioxabenzofos, dioxacarb, dioxathion, disulfoton, dithicrofos, d-limonene, DNOC, DNOC-ammonium, DNOC-potassium, DNOC-sodium, doramectin, ecdysterone, emamectin, emamectin benzoate, EMPC, empenthrin, endosulfan, endothion, endrin, EPN, epofenonane, eprinomectin, esdepallethrine, esfenvalerate, etaphos, ethiofencarb, ethion, ethiprole, ethoate-methyl, ethoprophos, ethyl formate, ethyl-DDD, ethylene dibromide, ethylene dichloride, ethylene oxide, etofenprox, etrimfos, EXD, famphur, fenamiphos, fenazaflor, fenchlorphos, fenethacarb, fenfluthrin, fenitrothion, fenobucarb, fenoxacrim, fenoxycarb, fenpirithrin, fenpropathrin, fensulfothion, fenthion, fenthion-ethyl, fenvalerate, fipronil, flometoquin, flonicamid, flubendiamide (additionally resolved isomers thereof), flucofuron, flucycloxuron, flucythrinate, flufenerim, flufenoxuron, flufenprox, flufiprole, flupyradifurone, fluvalinate, fonofos, formetanate, formetanate hydrochloride, formothion, formparanate, formparanate hydrochloride, fosmethilan, fospirate, fosthietan, fufenozide, furathiocarb, furethrin, gamma-cyhalothrin, gamma-HCH, halfenprox, halofenozide, HCH, HEOD, heptachlor, heptenophos, heterophos, hexaflumuron, HHDN, hydramethylnon, hydrogen cyanide, hydroprene, hyquincarb, imidacloprid, imiprothrin, indoxacarb, iodomethane, IPSP, isazofos, isobenzan, isocarbophos, isodrin, isofenphos, isofenphos-methyl, isoprocarb, isoprothiolane, isothioate, isoxathion, ivermectin, jasmolin I, jasmolin II, jodfenphos, juvenile hormone I, juvenile hormone II, juvenile hormone III, kelevan, kinoprene, lambda-cyhalothrin, lead arsenate, lepimectin, leptophos, lindane, lirimfos, lufenuron, lythidathion, malathion, malonoben, mazidox, mecarbam, mecarphon, menazon, meperfluthrin, mephosfolan, mercurous chloride, mesulfenfos, metaflumizone, methacrifos, methamidophos, methidathion, methiocarb, methocrotophos, methomyl, methoprene, methothrin, methoxychlor, methoxyfenozide, methyl bromide, methyl isothiocyanate, methylchloroform, methylene chloride, metofluthrin, metolcarb, metoxadiazone, mevinphos, mexacarbate, milbemectin, milbemycin oxime, mipafox, mirex, molosultap, monocrotophos, monomehypo, monosultap, morphothion, moxidectin, naftalofos, naled, naphthalene, nicotine, nifluridide, nitenpyram, nithiazine, nitrilacarb, novaluron, noviflumuron, omethoate, oxamyl, oxydemeton-methyl, oxydeprofos, oxydisulfoton, para-dichlorobenzene, parathion, parathion-methyl, penfluron, pentachlorophenol, permethrin, phenkapton, phenothrin, phenthoate, phorate, phosalone, phosfolan, phosmet, phosnichlor, phosphamidon, phosphine, phoxim, phoximmethyl, pirimetaphos, pirimicarb, pirimiphos-ethyl, pirimiphos-methyl, potassium arsenite, potassium thiocyanate, pp'-DDT, prallethrin, precocene I, precocene II, precocene III, primidophos, profenofos, profluralin, profluthrin, promacyl, promecarb, propaphos, propetamphos, propoxur, prothidathion, prothiofos, prothoate, protrifenbute, pymetrozine, pyraclofos, pyrafluprole, pyrazophos, pyresmethrin, pyrethrin I, pyrethrin II, pyrethrins, pyridaben, pyridalyl, pyridaphenthion, pyrifluquinazon, pyrimidifen, pyrimitate, pyriprole, pyriproxyfen, quassia, quinalphos, quinalphos-methyl, quinothion, rafoxanide, resmethrin, rotenone, ryania, sabadilla, schradan, selamectin, silafluofen, silica gel, sodium arsenite, sodium fluoride, sodium hexafluorosilicate, sodium thiocyanate, sophamide, spinetoram, spinosad, spiromesifen, spirotetramat, sulcofuron, sulcofuron-sodium, sulfluramid, sulfotep, sulfoxaflor, sulfuryl fluoride, sulprofos, tau-fluvalinate, tazimcarb, TDE, tebufenozide, tebufenpyrad, tebupirimfos, teflubenzuron, tefluthrin, temephos, TEPP, terallethrin, terbufos, tetrachloroethane, tetrachlorvinphos, tetramethrin, tetramethylfluthrin, theta-cypermethrin, thiacloprid, thiamethoxam, thicrofos, thiocarboxime, thiocyclam, thiocyclam oxalate, thiodicarb, thiofanox, thiometon, thiosultap, thiosultap-disodium, thiosultap-monosodium, thuringiensin, tolfenpyrad, tralomethrin, transfluthrin, transpermethrin, triarathene, triazamate, triazophos, trichlorfon, trichlormetaphos-3, trichloronat, trifenofos, triflumuron, trimethacarb, triprene, vamidothion, vaniliprole, XMC, xylylcarb, zeta-cypermethrin, and zolaprofos.

Additionally, any combination of the above pesticides can be used.

For more information consult "Compendium of Pesticide Common Names" located at http://www.alanwood.net/pesticides/index.html as of the filing date of this document. Also consult "The Pesticide Manual" 15th Edition, edited by C D S Tomlin, copyright 2009 by British Crop Production Council.

In one embodiment, the pesticide is one that has an immediate effect upon ingestion by or contact with a pest (referred to herein as an "immediate action" pesticide or a "fast acting" pesticide). For example, insecticides that have immediate killing action upon ingestion by termites include chlorpyrifos, spinosad, imidacloprid and fipronil, each of which is well known and available commercially. As used herein, the term "immediate" is intended to mean that the pesticide typically operates to kill an individual pest before the pest returns to its colony. In another embodiment, the pesticide is one that exhibits a delayed effect upon ingestion by or contact with a pest (referred to herein as a "delayed action" pesticide). Non-limiting examples of insecticides that have delayed killing activity upon ingestion by or contact with termites include hexaflumuron and noviflumuron, each of which is well known and available commercially. As used herein, the term "delayed" is intended to mean that the pesticide typically does not operate to kill an individual pest until after the pest has returned to its colony. In another embodiment, the pesticide is selected from the group consisting of hexaflumuron, lufenuron, flufenoxuron, diflubenzuron, bistrifluron, sulfuramid, hydramethylnon, novaluron and noviflumuron.

In one form, the composition of the composite member is limited to the bait material and the pesticide. However, in addition to the bait material and the pesticide, other ingredients can optionally be included in the composite member. For example, some ingredients can be included to increase the stability or shelf life of the pesticide included in the composite member. Other ingredients can be selected to improve the processability of the mixture, or to provide an advantageous effect after the composite member is formed. Still other ingredients can be selected, for example, to attract pests to the composite member or to stimulate feeding. The composite member disclosed herein can also include or be used with herbicides and fungicides, both for reasons of economy and synergy. The composite member disclosed herein can also include or be used with antimicrobials, bactericides, defoliants, safeners, synergists, algaecides, attractants, desiccants, pheromones, repellants, animal dips, avicides, disinfectants, semiochemicals, and molluscicides (these categories not necessarily mutually exclusive) for reasons of economy and synergy. In addition, it is contemplated that one or more binders or binding agents could be included in the composite member. Still, in another form, the composite member includes a thermoplastic polymer material in addition to the bait material and the pesticide, non-limiting examples of which are described in International Patent Publication No. WO 2008/

079384. In one embodiment, the composite member includes from about 0.001% to about 5% by weight pesticide. In yet another embodiment, the composite member includes from about 0.1% to about 5% by weight pesticide. In still another embodiment, the pesticide is present in an amount in the range of from about 0.1% to about 4% by weight. In another embodiment, the pesticide is present in an amount from about 0.2% to about 3% by weight. Still, in another embodiment, the pesticide is present in an amount from about 0.3% to about 2% by weight. However, it should be appreciated that alternative values for the amount of pesticide present in the composite member described herein are possible.

In one form, the composite member described herein can be formed by extruding a mixture of the bait material and the pesticide into a desired shape, such as the shape of disk 50. In one particular form, the composite member can be formed by mixing a thermoplastic polymer, wood fragments or other cellulosic materials, and a pesticide, creating a molten or flowable material from the resulting mixture, and extruding or molding the molten material into a desired final shape. Further examples and details of suitable extruded composite members are found in International Patent Application Publication No. WO 2008/079384. Another example of a suitable extruded composite member is Recruit® HD, which is commercially available from Dow AgroSciences, LLC, 9330 Zionsville Road, Indianapolis, Ind. 46268.

In another form, the composite member described herein can be formed by grinding a mixture of the bait material and the pesticide in a grinder and then processing the ground material in a press (such as a Carver press) to provide a compressed form of the composite member. It should be appreciated that the press can be configured to provide the compressed form of the pesticidal baits with a desirable configuration such as disk 50, among other possibilities. In one form, the composite member is compressed at a pressure between about 5,000 and about 40,000 psi. In another form, the composite member is compressed at a pressure between about 10,000 and about 35,000 psi. Still, in another form the composite member is compressed at a pressure between about 12,000 and about 26,000 psi. However, it should be appreciated that additional variations in the pressure at which the composite member is compressed are contemplated. Moreover, a wide variety of material specifications and process parameters can affect the pressure at which the composite member is compressed. Still, other approaches contemplated for forming the composite member include extrusion (with or without post-extrusion processing), original mold design (with or without post-molding processing), and injection molding, just to provide a few non-limiting possibilities.

In one approach, the bait material, such as purified alpha cellulose for example, is pre-loaded with the pesticide before being ground in the grinder. In one manner of pre-loading, the pesticide is sprayed directly on cellulose particles, and the mixture of cellulose particles and pesticide is then compacted and broken into prills, which include the cellulose food material and the pesticide therein. When this approach is used, the pesticide is referred to as "incorporated in cellulose," and this method is referred to as an "incorporated in cellulose" method. In another manner of pre-loading the bait material with the pesticide, pre-formed prills of cellulose (which are available commercially, and can be obtained from International Fibers Corporation, North Tonawanda, N.Y.) are sprayed with the pesticide to provide a pre-loaded cellulose material. When this approach is used, the pesticide is referred to as "sprayed on cellulose," and this method is referred to as a "sprayed on cellulose" method. Still, in another approach, one or more Shatter™ termite baits (commercially available from Dow AgroSciences, LLC, 9330 Zionsville Road, Indianapolis, Ind. 46268) can be ground in the grinder and then processed with the press. The Shatter™ termite baits include a bait material in the form of cellulose and a pesticide in the form of hexaflumuron.

EXAMPLES

The following examples are for illustration purposes and are not to be construed as limiting the invention disclosed in this document to only the embodiments disclosed in these examples.

Example I

Testing was performed to determine the effect in the field of an extruded composite member in the form of Recruit® HD, further details of which are provided in U.S. patent application Ser. No. 12/004,655, on *Coptotermes* spp. More particularly, a 100 hectare plot of oil palm trees was divided into four quadrants: Quadrants A, B, C and D. The palm oil trees in each of Quadrants A-D were investigated for the presence of termite activity or infestation, and the affected trees were marked accordingly. The affected trees in Quadrants A and C were each treated with liquid fipronil (2.5 ml/5 L drenching), and the affected trees in Quadrants B and D were each treated with a 50 g extruded composite member in the form of Recruit® HD (0.5% hexaflumuron) in a manner similar to that described above in connection with system 60. For Quadrants B and D, consumption of the extruded composite members was investigated and recorded accordingly. Post-treatment inspection of the affected trees was performed on a monthly basis for 24 months following initiation of treatment. Table 1 below shows the results of the treatment at 7 months, 12 months, 18 months, and 24 months following initiation of treatment.

TABLE 1

|          |                              |                     | Infested Trees |          |           |           |           |
|----------|------------------------------|---------------------|----------|----------|-----------|-----------|-----------|
| Quadrant | Treatment                    | Trees in Quadrant | 0 months | 7 months | 12 months | 18 months | 24 months |
| A        | Fipronil                     | 2246                | 29       | 30       | 29        | 20        | 13        |
| C        | Fipronil                     | 2215                | 71       | 45       | 51        | 40        | 22        |
| B        | Recruit ® HD (0.5% hexaflumuron) | 2232            | 51       | 36       | 0         | 20        | 8         |
| D        | Recruit ® HD (0.5% hexaflumuron) | 2200            | 65       | 28       | 0         | 20        | 15        |

Figure 6:
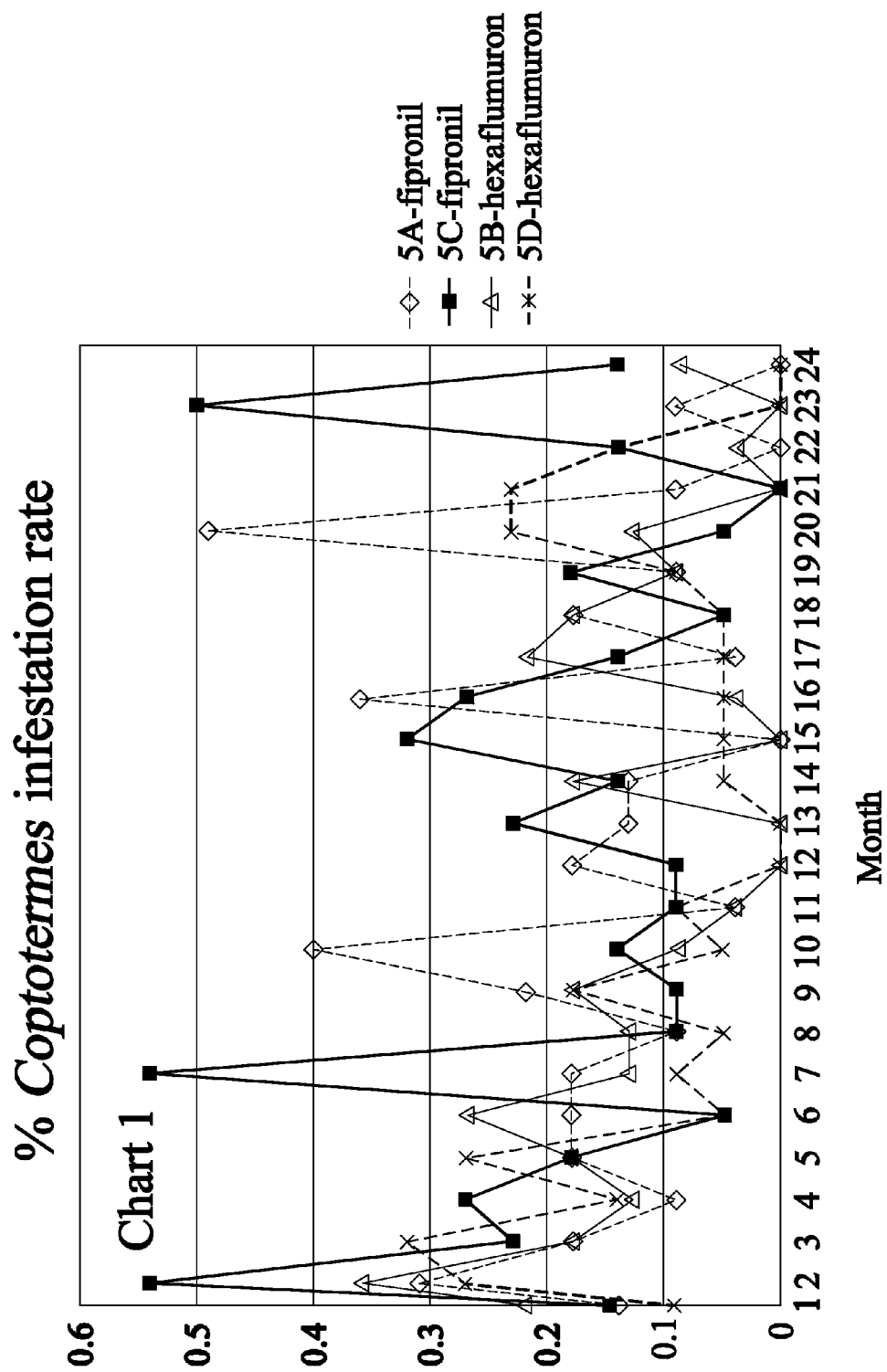
FIG. 6 is a graphical illustration depicting pest infestation rates over time and in response to various control techniques.

The results of the treatments in Quadrants A-D on a monthly basis over a 24 month period of time following initial treatment are graphically illustrated in FIG. 6.

Example II

Testing was performed to determine the effect in the field of an extruded composite member in the form of Recruit® HD, further details of which are provided in U.S. patent application Ser. No. 12/004,655, on *Coptotermes* spp. More particularly, a 60 hectare plot of oil palm trees was divided into two plots. The palm oil trees in each of the plots were investigated for the presence of termite activity or infestation, and the affected trees were marked accordingly. The affected trees in plot 1 were each treated with liquid fipronil (2.0 ml/5 L drenching), and the affected trees in plot 2 were each treated with a 50 g extruded composite member in the form of Recruit® HD (0.5% hexaflumuron) in a manner similar to that described above in connection with system 60. For plots 1 and 2, consumption of the extruded composite members was investigated and recorded accordingly. Post-treatment inspection of the affected trees was performed on a monthly basis for 24 months following initiation of treatment. Table 2 below shows the results of the treatment at 7 months, 12 months, 18 months, and 24 months following initiation of treatment. Table 3 below shows the cumulative results of this study.

TABLE 2

| | | | Infested Trees | | | | |
|---|---|---|---|---|---|---|---|
| Plot | Treatment | Trees in Plot | 0 months | 7 months | 12 months | 18 months | 24 months |
| 1 | Fipronil | 4461 | 100 | 75 | 80 | 60 | 35 |
| 2 | Recruit ® HD (0.5% hexaflumuron) | 4432 | 116 | 64 | 0 | 40 | 23 |

TABLE 3

| | | Trees in | % Infestation | | |
|---|---|---|---|---|---|
| Plot | Treatment | Plot | Pre-Treatment | 1 year | 2 year |
| 1 | Fipronil | 4461 | 2.24 | 2.31 | 1.76 |
| 2 | Recruit ® HD (0.5% hexaflumuron) | 4432 | 2.61 | 1.55 | 0.93 |

Example III

Testing was performed to determine the effect in the field of an extruded composite member in the form of Recruit® HD, further details of which are provided in U.S. patent application Ser. No. 12/004,655, on *Coptotermes* spp. More particularly, a 1255.70 hectare plot of oil palm trees was divided into 18 blocks ranging from 15.97 hectares to 58.70 hectares. The palm oil trees in each of Blocks 1-18 were investigated every two months over the course of a year for the presence of termite activity or infestation, and the affected trees were marked accordingly. The affected trees which were newly identified at each two month period were each treated with a 30 g extruded composite member in the form of Recruit® HD (0.5% hexaflumuron) in a manner similar to that described above in connection with system 60. Consumption of the extruded composite members was investigated and recorded accordingly. The affected trees were re-investigated each two month period following treatment. Table 4 below shows the cumulative results of each survey performed.

TABLE 4

| Total area (Ha) | Total Palms | Survey 1 (# infested palm) | Survey 2 | Survey 3 | Survey 4 | Survey 5 | Survey 6 |
|---|---|---|---|---|---|---|---|
| 1255.70 | 185,844 | 1728 | 1166 | 891 | 648 | 227 | 512 |
| | % infestation | 0.93 | 0.62 | 0.48 | 0.35 | 0.12 | 0.28 |
| | % Control | N/A | 33.3 | 48.4 | 62.4 | 87.1 | 69.9 |

While multiple embodiments have been illustrated and described in detail in the drawings and foregoing description, the same is to be considered illustrative and not restrictive in character, it being understood that only selected embodiments have been shown and described and that all changes, equivalents, and modifications as would occur to those skilled in the art and that come within the scope of the inventions described herein or defined by the following claims are desired to be protected. Any theory, mechanism of operation, proof, or finding stated herein is meant to further enhance understanding of the present application and is not intended to limit the inventions in any way to such theory, mechanism of operation, proof, or finding. In addition, the various procedures, techniques, and operations may be altered, rearranged, substituted, deleted, duplicated, or combined as would occur to those skilled in the art. In reading the claims, words such as the word "a," the word "an," the words "at least one," and the words "at least a portion" are not intended to limit the claims to only one item unless specifically stated to the contrary. Further, when the language "at least a portion" and/or "a portion" is used, the claims may include a portion and/or the entire item unless specifically stated to the contrary.

What is claimed is:
1. A method, comprising:
    identifying a first location at a growing site;
    forming a hole at the first location configured to receive a woody plant;
    positioning a composite member in the hole; and transplanting the woody plant from a second location to the first location, the transplanting including placing the woody plant in the hole over the composite member;

wherein the composite member is effective for controlling termite infestation of the woody plant and includes a pesticide and a bait material palatable to one or more species of termites.

2. The method of claim 1, wherein the woody plant is an oil palm tree or a rubber tree.

3. The method of claim 1, wherein the composite member is disk-shaped.

4. The method of claim 1, wherein the woody plant is an immature oil palm tree.

5. The method of claim 1, wherein the composite member includes an extruded mixture of the pesticide and bait material.

6. The method of claim 1, wherein the pesticide is selected from the group consisting of noviflumuron, hexaflumuron, lufenuron, flufenoxuron, diflubenzuron, bistrifluron, sulfuramid, novaluron and hydramethylnon.

7. The method of claim 1, wherein the bait material comprises alpha cellulose.

8. The method of claim 1, wherein the composite member weighs at least about 30 grams.

* * * * *